US009525719B2

(12) United States Patent
Frerking

(10) Patent No.: US 9,525,719 B2
(45) Date of Patent: *Dec. 20, 2016

(54) HTTP PARALLEL PROCESSING ROUTER

(71) Applicant: WAL-MART STORES, INC., Bentonville, AR (US)

(72) Inventor: John Randy Frerking, Prairie Grove, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/603,476

(22) Filed: Jan. 23, 2015

(65) Prior Publication Data

US 2015/0134487 A1    May 14, 2015

Related U.S. Application Data

(63) Continuation of application No. 13/653,801, filed on Oct. 17, 2012, now Pat. No. 8,972,526.

(51) Int. Cl.
*H04L 29/08*     (2006.01)
*G06Q 30/06*    (2012.01)

(52) U.S. Cl.
CPC ........... *H04L 67/02* (2013.01); *G06Q 30/0623* (2013.01); *H04L 67/327* (2013.01)

(58) Field of Classification Search
USPC ................................. 709/217, 219, 203, 244
See application file for complete search history.

(56) References Cited

U.S. PATENT DOCUMENTS

| 6,693,896 | B1 | 2/2004 | Utsumi et al. |
| 6,711,407 | B1 * | 3/2004 | Cornils .............. H04B 7/18584 370/258 |
| 6,823,391 | B1 | 11/2004 | Deen et al. |
| 8,769,629 | B2 | 7/2014 | Shatzkamer et al. |
| 8,972,526 | B2 * | 3/2015 | Frerking ............... H04L 67/327 709/208 |

(Continued)

OTHER PUBLICATIONS

Carla Sadtler and Diego Cotignola, Router Solutions using Web Services Gateway, 2004, IBM/Redbook, 72 pages Retrived from: http://www.redbooks.ibm.com/redpapers/pdfs/redp3841.pdf.

(Continued)

*Primary Examiner* — Jude Jean Gilles
(74) *Attorney, Agent, or Firm* — Fitch, Even, Tabin & Flannery LLP

(57) ABSTRACT

According to one aspect, embodiments of the invention provide a router having a first I/O terminal and a second I/O terminal, wherein the first I/O terminal is configured to be in communication with at least one client via a first network, wherein the second I/O terminal is configured to be in communication with a plurality of remote servers via a second network, and wherein the router is configured to receive, at the first I/O terminal via the first network, a web services request from the at least one client, identify, based on the web services request from the at least one client, a group of the plurality of remote servers that are capable of fulfilling the web services request, and transmit, in parallel via the second I/O terminal and the to second network, the received web services request to each one of the plurality of remote servers within the group.

20 Claims, 4 Drawing Sheets

(56) References Cited

U.S. PATENT DOCUMENTS

| | | | |
|---|---|---|---|
| 9,001,979 B2* | 4/2015 | Nix | G06Q 30/02 379/114.12 |
| 2002/0082960 A1 | 6/2002 | Goedken | |
| 2003/0009437 A1 | 1/2003 | Seiler et al. | |
| 2008/0172455 A1* | 7/2008 | Masucci | G06Q 30/02 709/203 |
| 2008/0279200 A1 | 11/2008 | Shatzkamer et al. | |
| 2008/0320144 A1 | 12/2008 | Stewart et al. | |
| 2009/0099931 A1* | 4/2009 | Aaltonen | G06Q 30/0257 705/14.55 |
| 2011/0060666 A1 | 3/2011 | Gromek et al. | |
| 2011/0142053 A1 | 6/2011 | Van Der Merwe et al. | |
| 2011/0167475 A1 | 7/2011 | Hoover et al. | |
| 2012/0005371 A1 | 1/2012 | Ravindran et al. | |
| 2012/0297073 A1 | 11/2012 | Glover et al. | |
| 2013/0132292 A1* | 5/2013 | Lamb | G06Q 30/018 705/318 |
| 2013/0132498 A1 | 5/2013 | Wainner et al. | |
| 2014/0108596 A1 | 4/2014 | Frerking | |

OTHER PUBLICATIONS

Declaration of John Randy Frerking executed on Oct. 24, 2012, 2 pages.

Notification of Transmittal of the International Search Report and the Written Opinion of the International Searching Authority from corresponding PCT/US2013/061874 mailed Jan. 2, 2014.

U.S. Appl. No. 13/653,801; Notice of Allowance mailed Nov. 21, 2014.

U.S. Appl. No. 13/653,801; Office Action mailed Jul. 10, 2014.

* cited by examiner

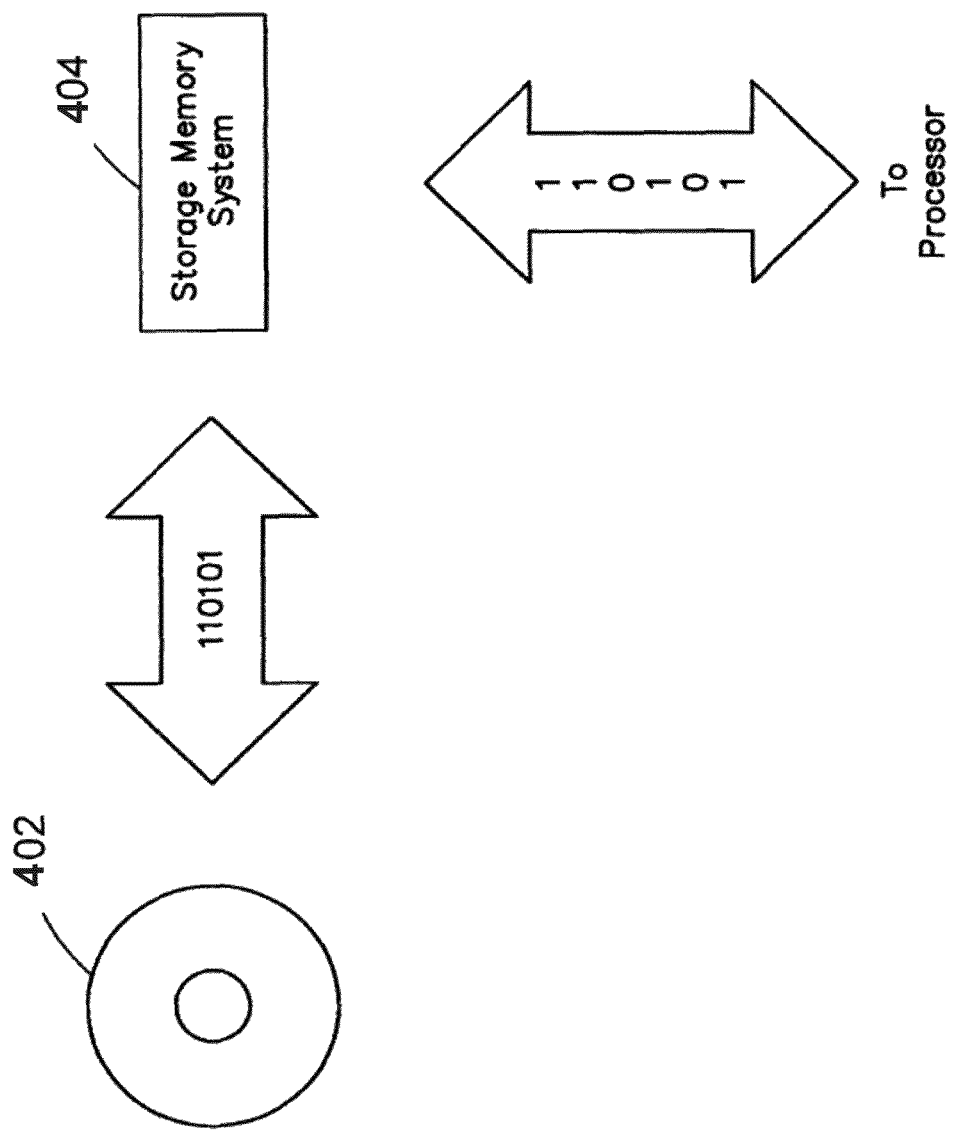

HTTP PARALLEL PROCESSING ROUTER

CROSS-REFERENCE TO RELATED APPLICATION

This application is a continuation of U.S. patent application Ser. No. 13/653,801 entitled "HTTP PARALLEL PROCESSING ROUTER," filed on Oct. 17, 2012, which is herein incorporated by reference in its entirety.

BACKGROUND OF THE DISCLOSURE

Field of the Invention

Aspects of the present invention relate generally to systems that process product information requests from a client to multiple servers.

Discussion of Related Art

Customers commonly utilize internet-based interfaces, such as online shopping portals of websites or in-store terminals, to browse through, purchase, or retrieve information related to products provided by a company. Through such an interface, customers are able to retrieve information about a specific product such as the availability (e.g., store locations within a defined area at which the product is available) and the price of the product. Typically, customers retrieve product information, such as availability or price, by submitting an inquiry or request to the interface and the interface communicates with one or more store servers to retrieve the requested information. Such product information requests are commonly formatted as Hypertext Transfer Protocol (HTTP)/Hypertext Transfer Protocol Secure (HTTPS) or asynchronous Message Queue (MQ) requests.

SUMMARY

Aspects in accord with the present invention are directed to a server comprising a router, the router having a first Input/Output (I/O) terminal and a second I/O terminal, wherein the first I/O terminal of the router is configured to be in communication with at least one client via a first network, wherein the second I/O terminal of the router is configured to be in communication with a plurality of remote servers via a second network, and wherein the router is configured to receive, at the first I/O terminal via the first network, a web services request from the at least one client, identify, based on the web services request from the at least one client, a group of the plurality of remote servers that are capable of fulfilling the web services request, and transmit, in parallel via the second I/O terminal and the second network, the received web services request to each one of the plurality of remote servers within the group.

According to one embodiment, the router is a code-based router implemented in the server. In one embodiment, the router is implemented in a Customer Information Control System (CICS) of a mainframe platform.

According to one embodiment, the router is further configured to receive, at the second I/O terminal and via the second network, a plurality of responses to the web services request to from the plurality of remote servers within the group, compile the plurality of responses from the plurality of remote servers into a single response, and transmit, via the first I/O terminal and the first network, the single response to the at least one client. In one embodiment, at least one of the plurality of responses received by the router from the plurality of remote servers includes information retrieved from databases within the plurality of remote servers. In another embodiment, the at least one of the plurality of responses received by the router from the plurality of remote servers includes price information related to at least one product. In one embodiment, the at least one of the plurality of responses received by the router from the plurality of remote servers includes availability information related to at least one product.

According to another embodiment, the web services request transmitted to each one of the plurality of remote servers within the group includes Universal Product Code (UPC) information related to at least one product. In one embodiment, a first web services request transmitted to a first group of the plurality of remote servers includes first UPC information related to a first product and a second web services request transmitted to a second group of the plurality of remote servers includes second UPC information related to a second product.

Another aspect in accord with the present invention is directed to a method for operating a router configured to communicate with at least one client and a plurality of remote servers, the method comprising receiving, at the router, a web services request from the at least one client, identifying, based on the web services request from the at least one client, a group of the plurality of remote servers that are capable of fulfilling the request, and transmitting in parallel, with the router, the web services request to each one of the plurality of remote servers within the group.

According to one embodiment, the method further comprises receiving, by the router from the plurality of remote servers, a plurality of responses to the web services request, compiling the plurality of responses from the plurality of remote servers into a single request, and transmitting the single request to the at least one client. In one embodiment, the method further comprises retrieving, by at least one of the plurality of remote servers from a database within the at least one of the plurality of remote servers, information based on the web services request, and transmitting, by the at least one of the plurality of remote servers to the router, one of the plurality of responses including the information based on the web services request.

According to another embodiment, receiving, at the router, a web services request to includes receiving, at the router, a request for information generated by an individual at a computer. In one embodiment, the web services request transmitted from the router to each one of the plurality of remote servers within the group includes UPC information related to at least one product. In another embodiment, at least one of the plurality of responses to the web services request includes at least one of price and availability information related to the at least one product. In one embodiment, transmitting the web services request to each one of the plurality of remote servers within the group includes transmitting a request for information including first UPC information related to a first product to a first group of the plurality of remote servers and transmitting a request for information including second UPC information related to a second product to a second group of the plurality of remote servers.

At least one aspect in accord with the present invention is directed to a computer readable medium comprising computer-executable instructions that when executed on a processor performs a method for operating a router configured to communicate with at least one client and a plurality of remote servers, the method comprising receiving, at the router, a web services request from the at least one client, identifying, based on the web services request from the at least one client, a group of the plurality of remote servers that are capable of fulfilling the request, and transmitting in parallel, with the router, the web services request to each one of the plurality of remote servers within the group.

According to one embodiment, the method further comprises receiving, by the router from the plurality of remote servers, a plurality of responses to the web services request, compiling the plurality of responses from the plurality of remote servers into a single request, and transmitting the single request to the at least one client. In one embodiment, the web services request transmitted from the router to each one of the plurality of remote servers within the group includes UPC information related to at least one product. In another embodiment, at least one of the plurality of responses to the web services request includes at least one of price and availability information related to the at least one product.

BRIEF DESCRIPTION OF DRAWINGS

The accompanying drawings are not intended to be drawn to scale. In the drawings, each identical or nearly identical component that is illustrated in various Figures is represented by a like numeral. For purposes of clarity, not every component may be labeled in every drawing. In the drawings:

FIG. 4 is a block diagram of a computer data storage system with which various embodiments of the invention may be practiced.

DETAILED DESCRIPTION

Figure 1:
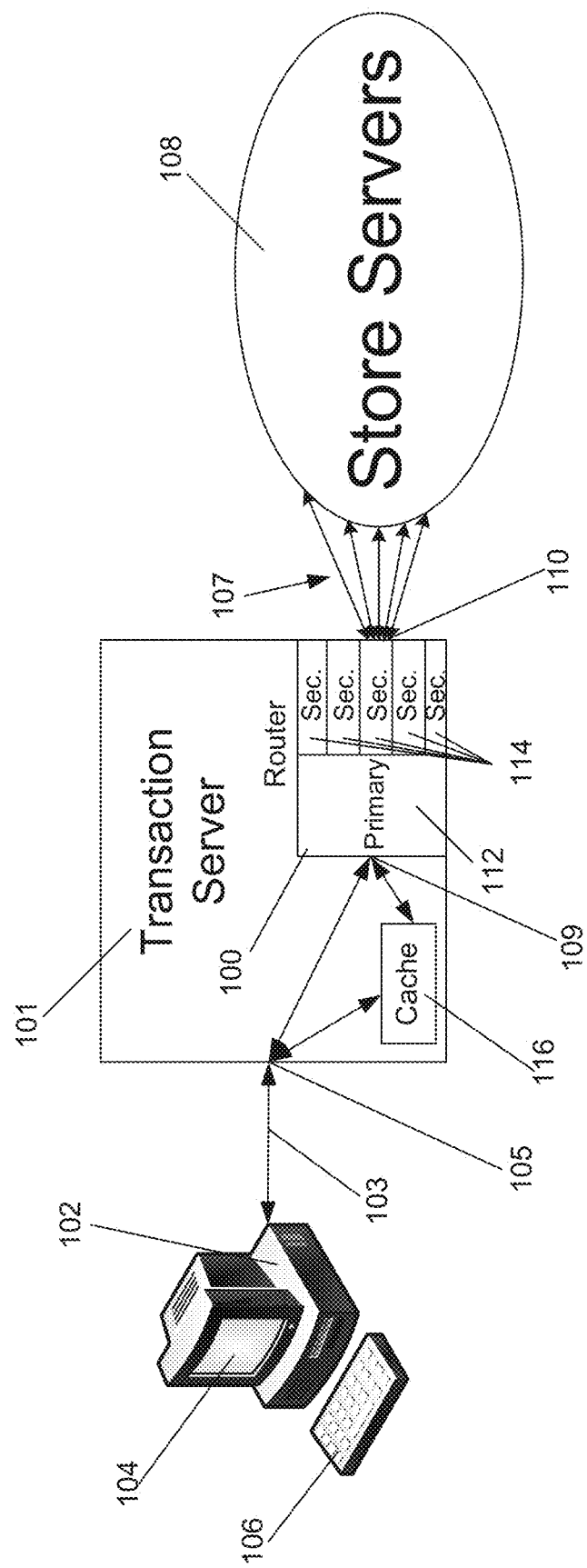
FIG. 1 illustrates a block diagram of one embodiment of a HTTP/HTTPS parallel processing router in accordance with one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, product information requests are commonly formatted as HTTP/HTTPS or asynchronous MQ requests. Typical routers are capable of processing multiple HTTP/HTTPS product information requests in series or multiple asynchronous MQ requests in parallel; however, due to their configuration, such routers may be limited in the number of requests they are able to make and the number of stores they are able to communicate with over a given period of time. Accordingly, an individual utilizing an HTTP/HTTPS serial processing router or an asynchronous MQ processing router to handle multiple requests may not receive requested information in a timely manner and/or may not receive as detailed information (e.g., from as many stores) as is desired.

Therefore, embodiments described herein provide an HTTP/HTTPS parallel processing router capable of handling a greater number of requests and communicating with a greater number of stores than a HTTP/HTTPS serial processing or an asynchronous MQ processing router, over a same period of time.

FIG. 1 illustrates a block diagram of one embodiment of a HTTP/HTTPS parallel to processing router 100 in accordance with one aspect of the present invention. According to one embodiment, the router 100 is a code-based router implemented in a transaction server 101. In one embodiment the transaction server 101 is a Customer Information Control System (CICS) of an IBM mainframe platform. However, in other embodiments, the router 100 may be implemented in any type of transaction server and on any different platform (e.g., such as a Windows or UNIX/Linux based platform).

According to one embodiment, an Input/Output (I/O) terminal 105 of the transaction server 101 (and hence a first I/O terminal 109 of the router 100) is in communication with a client 102 via a network 103 (e.g., such as the internet or a Local Area Network (LAN)). According to one embodiment, the client 102 is a computer 102 having a display 104 and interface 106. According to another embodiment, the transaction server 101 (including the router 100) may be located within the client 102 (e.g., such as within an in-store terminal) and hence, communication via the network 103 may not be necessary.

According to one embodiment, a second I/O terminal 110 of the router 100 is also in communication with a plurality of store servers 108 via a network 107 (e.g., such as the Internet). In one embodiment, each one of the store servers 108 is located at a different store location and includes a database which stores product information regarding products available at the associated store location.

When an individual wishes to receive information regarding a specific product that he/she is interested in, the individual utilizes the interface 106 of the client 102 to generate an HTTP/HTTPS based product information request. According to one embodiment, the HTTP/HTTPS based product information request is a standard HTTPS/POST request. However, in other embodiments, GET, PUT and DELETE requests may also be supported.

As described above and according to one embodiment, a product information request may include a request for additional information regarding the price of a product or the availability of a product at a certain store location. According to one embodiment, the product information request includes Universal Product Code (UPC) information associated with the product about which information is desired; however, in other embodiments, the product information request may include any appropriate product information.

According to one embodiment, the product information requests also may include store server information which is intended to identify the store servers to which the request is desired to be sent. In one embodiment, the store server information includes direct identification information such as identification numbers of the desired store servers. In another embodiment, the store server information includes criteria which is utilized to define the store servers to which the request is desired to be sent.

According to one embodiment, the product information requests sent by the client 102 to the router 100 may request information regarding a single product; however, in other embodiments, the product information requests may request information regarding any number of products.

According to one embodiment, as web services, the product information requests are Simple Object Access Protocol (SOAP)/XML based messages. In one embodiment, the SOAP/XML based product information requests are defined in a Web Service Descriptor Language (WSDL)

document, where the UPCs and desired store server information are included in defined variable occurring arrays. This allows the individual who generated the product information request to the router 100 to provide a list of desired store servers and a list of UPCs (i.e. in the WSDL document) in a single product information request.

The product information request is sent from the client 102 to the transaction server 101 and the router 100, via the network 103. The first I/O terminal 109 receives the HTTP/HTTPS based product information request from the client 102. A primary program 112 of the router 100 interfaces with the client and the request via the first I/O terminal 109. In response to receiving the product information request and based on the store server information within the request (e.g., within the WSDL document), the router 100 starts a plurality of parallel secondary programs 114. Each one of the plurality of parallel secondary programs 114 started by the router 100 receives the request from the primary program 112 and is configured to transmit the HTTP/HTTPS-based request to a desired store server 108 (e.g., the router 100 "fans out" the request to multiple servers 108 in parallel) via the second I/O terminal 110. According to one embodiment, the router 100 will start a secondary program 114 for each store server to which the request is desired to be sent.

For example, according to one embodiment, where a product information request indicates that the user wishes to send the request to three different store servers 108, upon receiving the request, the router 100 will start three parallel secondary programs 114. Each one to of the three parallel secondary programs 114 sends the product information request to a different one of the three desired store servers 108. However, in other embodiments, any number of secondary programs 114 may be started by the router 100 to send the product information request to any number of store servers 108.

According to one embodiment, each secondary program 114 transmits the product information request to a desired store server 108 "as is" (i.e., as it was received from the primary program 112). For example, in one embodiment, the individual product information requests sent by the secondary programs 114 to each desired store server 108 are the same SOAP/XML based messages, including the same WSDL documents (including store and UPC information), as received by the primary program 112. However, in one embodiment, there is at least one difference between requests received by the primary program 112 and requests sent by the secondary programs 114 in that a product information request sent by a secondary program 114 to a store server only includes the individual store information of the store to which the secondary program 114 has sent the request and not to each one of all the desired store servers.

According to one embodiment, as described above, the individual requests are sent to each store server 108 specifically identified in the request by the user. According to another embodiment, the request is sent to each one of the available store servers 108. In another embodiment, the request is sent to a limited number of store servers 108 determined based on store server information criteria defined within the received request. For example, according to one embodiment, the HTTP/HTTPS based request is only sent to a group of stores (e.g., store servers 108) within a defined proximity to the individual. However, in other embodiments, the group of store servers 108 to which the request is sent may be defined by any other criteria. According to one embodiment and as discussed above, each request sent to a store server 108 includes UPC information regarding the product of which information is desired.

According to one embodiment, the individual product information request sent by the router 100 to each store server 108 includes UPC information identifying the product(s) of which additional information is requested. According to one embodiment, the UPC information sent to each store server 108 is the same. However, in another embodiment, the UPC information sent to each store server 108 may be defined differently. For example, in one embodiment, based on a received product information request inquiring about multiple to products, the router 100 may send product information requests including first UPC information to a first group of store servers 108 requesting information about a first product and may send product information requests including second UPC information to a second group of store servers 108 requesting information about a second product.

Upon receiving a HTTP/HTTPS based request, a store server 108 analyzes the product information request including the UPC information and the type of information requested (e.g., within the WSDL document). The store server 108 retrieves the requested product information associated with the product(s) identified by the UPC information from its database. The database stores information regarding products available at the associated store location. For example, according to one embodiment, where the product information request inquires about the price of a certain product (e.g., as identified by the UPC information in the request) at a specific store location, the associated store server 108 retrieves the requested price information from the database. In another embodiment, where the product information request inquires about the availability of a certain product at a specific location, the associated store server 108 checks its database to determine whether the certain product is available at the associated store location. According to other embodiments, the product information request may inquire about any other type of information regarding a product and the store servers 108 may check their databases for appropriate information in response to the requests.

Upon retrieving the requested information from its database, each store server 108 which received the request from a secondary program 114 of the router 100 and gathered the requested information from its database transmits a response to the request to the second I/O terminal 110 of the router 100. The response includes the product information (e.g., regarding price or availability) which was originally requested by the individual at the client 102 and retrieved by the store server 108.

Each secondary program 114 which transmitted the product information request to a store server 108 receives a response from the store server 108 to which it sent the request. Each secondary program 114 provides the response to the primary program 112. According to one embodiment, a secondary program 114 provides the response "as is" to the primary program 112 (i.e., as it was received from the store server 108).

In another embodiment, when a secondary program fails (e.g., due to a network error, time-out, store service failure, etc.) the failed secondary program modifies the response message provided to the primary program 112 to indicate an unfavorable condition. According to one embodiment, the error information may also be logged in a common location or platform. This may allow for central monitoring and/or performance analysis of the system.

Upon receiving multiple responses from store servers 108 to which a request was sent (via the secondary programs 114), the primary program 112 of the router 100 accumulates all of the responses the router 100 has received into a single compiled response and transmits the single compiled response to the client 102 via the network 103. In one embodiment, the single compiled response is provided to the individual via the display 104 of the client 102.

According to one embodiment, synchronization between the primary program 112 and the secondary program(s) 114 is achieved through an internal registry and time management is controlled at the millisecond level. For example, in one embodiment, synchronization between the primary program and the secondary program(s) is achieved through an internal registry, time slicing using a z/OS STIMER Supervisor Call Instruction (SVC) at 2 millisecond intervals and by using an Enqueue (ENQ) list similar in nature to an Entry Control Block (ECB) list. However, in other embodiments, different methods of synchronization may be utilized.

Figure 2:
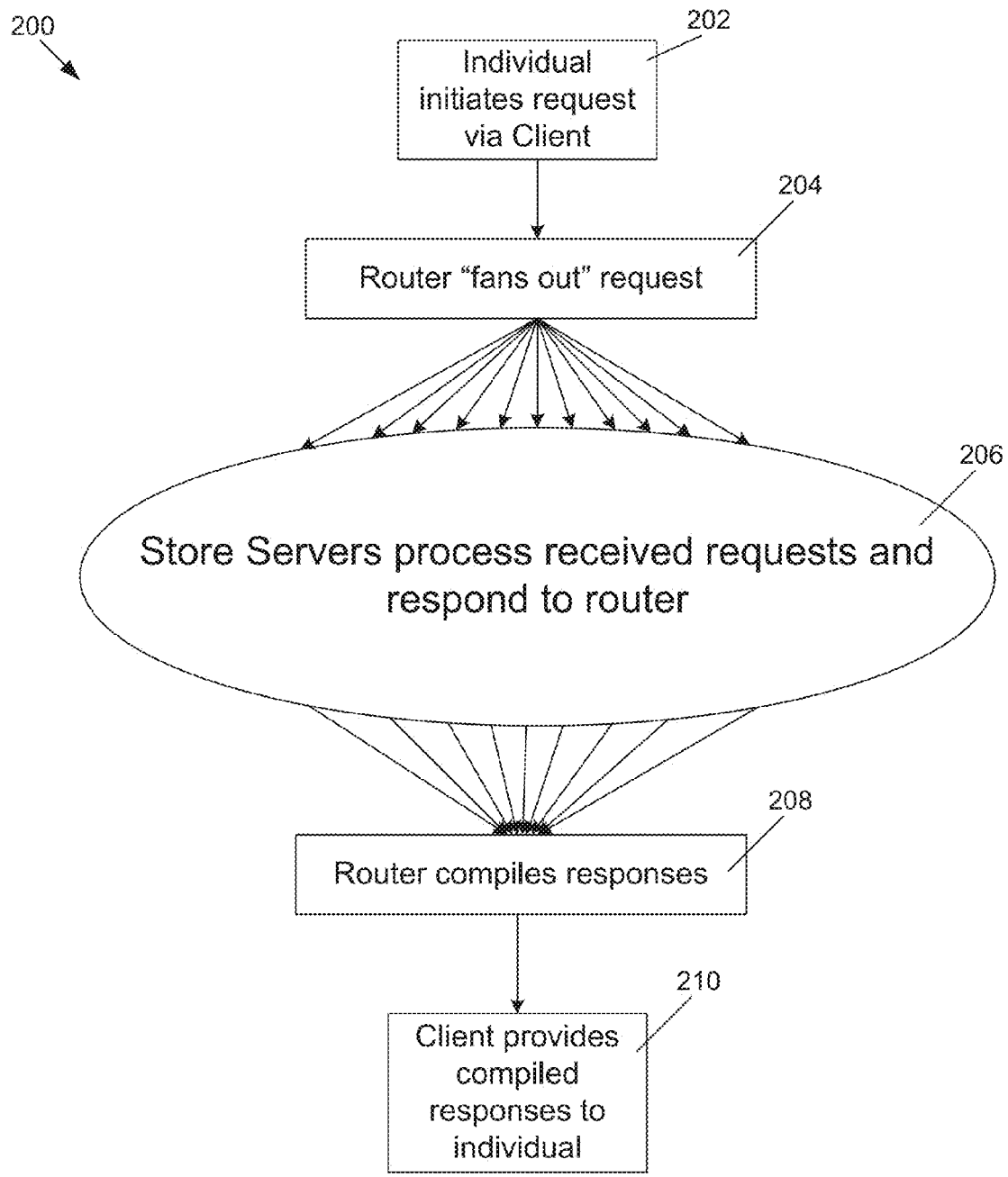
FIG. 2 is a flow chart illustrating a process for processing HTTP/HTTPS requests in parallel in accordance with one embodiment of the present invention.

FIG. 2 is a flow chart illustrating a process for processing HTTP/HTTPS requests in parallel in accordance with one embodiment of the present invention. At block 202 an individual wishing to receive additional information about a product (e.g., price and/or availability at a specific location) initiates a product information request with a client 102 (e.g., via an interface 106). According to one embodiment, the product information request initiated by the individual is an HTTP/HTTPS based request. According to one embodiment, the client 102 is a computer, as described above. The client 102 transmits the product information request to the router 100.

At block 204, the router 100 receives the product information request and "fans out" the request to desired store servers 108 (i.e. the router 100 sends the individual product information request to multiple desired stores server 108). For example, as described above, the primary program 112 of the router 100 receives the product information request. The router 100 starts a desired number of secondary programs 114 based on the store server information within the request (i.e. specific store server identification information or store server criteria) and the parallel secondary programs 114 transmit the request to the desired store servers 108.

At block 206, each store server 108 that has received the product information request, processes the request, receives the requested information (e.g., from its database) and sends a response (including the requested information) back to the router 100.

At block 208, the router 100 receives the multiple responses from the store servers 108 and compiles the responses into a single compiled response. For example, as described above, each secondary program 114 receives a response from the store server 108 to which it transmitted the request. The primary program 112 receives the plurality of responses from the secondary programs 114 and compiles the responses into a single compiled response. The router 100 transmits the single compiled response to the client 102.

At block 210, the client provides the single compiled response (including product information received from the multiple responses of the store servers 108) to the individual (e.g. via the display 104 of the client 102).

By "fanning out" a single request from a client 102 to multiple store servers 108, compiling the multiple responses from the store servers 108 into a single response and transmitting the single response to the client 102, the router 100 is able to communicate a single request to a relatively large number of stores while gathering information regarding one or more products from the relatively large number of stores.

For example, in one embodiment, where an individual issues a product information request for store #1 and store number #144 in regards to UPCs 111, 222, and 333, the primary program 112 receives the request including the WSDL document which identifies the desired stores and products. Based on the store and UPC information within the WSDL document (i.e. within the request), the primary program 112 starts two secondary programs 114, one for store #1 and one for store #144, and provides each secondary program 114 the three desired UPCs 111, 222 and 333. Each secondary program 114 transmits the product information request to its designated store server and retrieves the desired information from the store server. Upon receiving the desired information from a store server, the secondary program 114 passes along the information to the primary program 112.

The primary program 112 receives each of the stores responses (via the secondary programs 114) for each UPC. The primary program 112 waits until each of the secondary programs 114 either terminates successfully (i.e. passes along the desired information to the primary program 112), terminates abnormally, times-out, or fails to even be started. The to primary program 112 then compiles the received information from the multiple store servers into a single response and transmits the response to the original requestor. For those secondary programs 114 that failed to start, timed-out, or terminated abnormally, the primary program 112 provides an error message in the response for the store server that failed indicating that the "store is unavailable".

In one example, Applicant has appreciated that according to one embodiment, the router 100 is capable of supporting 1-20 stores and 1-96 items in a single request. In another embodiment, the router 100 is capable of supporting 1-50 stores and 1-300 items in a single request.

Additionally, by utilizing the parallel processing router 100 as described above to communicate a single request to multiple stores and to compile the multiple results into a single response, the router 100 is able to handle a relatively large number of requests and communicate with a relatively large number of store servers 108 over a given period of time. For example, Applicant has also appreciated that in one embodiment, ten-million product information requests may be received by the parallel processing router 100 in a day while during the same time, the received product information requests may be "fanned out" to store servers twenty-million times. According to another embodiment, forty-million product information requests may be received by the parallel processing router 100 in a day while during the same time, the received product information requests may be "fanned out" to store servers seventy-million times.

According to one embodiment, in addition to providing the compiled responses to the individual, compiled responses are also stored in a cache 116 for a period of time to provide improved response time for repeat product information requests. In one embodiment, the compiled responses are cached in a z/OS coupling facility. In addition to providing improved response time, caching the compiled responses may also protect store servers from being consumed or overwhelmed by "hot" items during specials or promotions or by a cyber attack as responses to previously answered requests may be generated based on information in the cache 116 rather than from the store servers themselves.

According to one embodiment, the router 100 may be utilized in multi-channel and Global eCommerce (GeC) products such as Store Level Availability and Pricing (SLAP) and Pick up Today (PuT); however, in other embodiments, the router 100 may be utilized with other appropriate products.

As described herein, the router 100 receives product information requests from a single client; however, in other embodiments, the router 100 may receive product information requests from any number of clients.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or data storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 3:
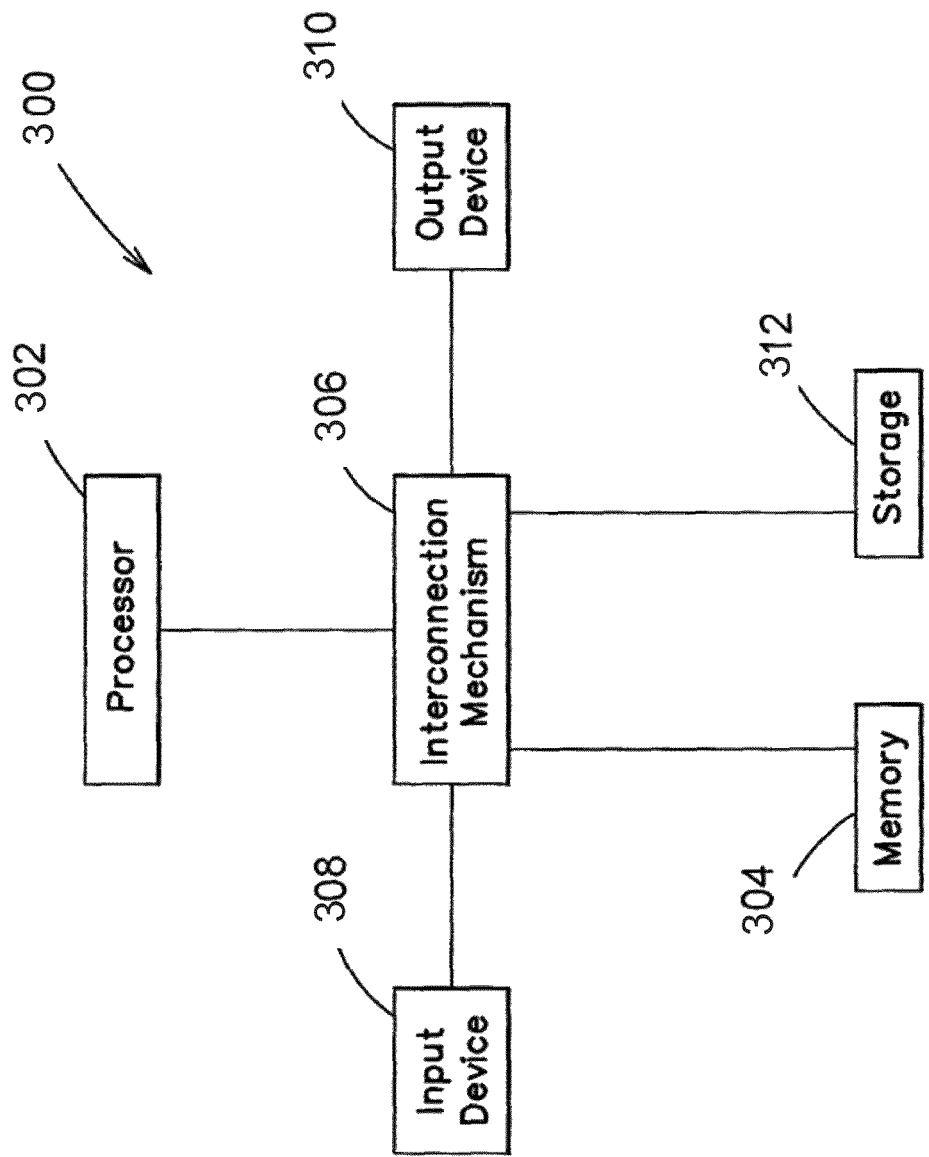
FIG. 3 is a block diagram of a general-purpose computer system upon which various embodiments of the invention may be implemented.

For example, various aspects of the invention may be implemented as specialized software executing in a general-purpose computer system 300 such as that shown in FIG. 3. The computer system 300 may include a processor 302 connected to one or more memory devices (i.e. data storage) 304, such as a disk drive, memory, or other device for storing data. Memory 304 is typically used for storing programs and data during operation of the computer system 300. Components of computer system 300 may be coupled by an interconnection mechanism 306, which may include one or more busses (e.g., between components that are integrated within a same machine) and/or a network (e.g., between components that reside on separate discrete machines). The interconnection mechanism 306 enables communications to (e.g., data, instructions) to be exchanged between system components of system 300. Computer system 300 also includes one or more input devices 308, for example, a keyboard, mouse, trackball, microphone, touch screen, and one or more output devices 310, for example, a printing device, display screen, and/or speaker. In addition, computer system 300 may contain one or more interfaces (not shown) that connect computer system 300 to a communication network (in addition or as an alternative to the interconnection mechanism 306).

The storage system 312, shown in greater detail in FIG. 4, typically includes a computer readable and writeable nonvolatile recording medium 402 in which signals are stored that define a program to be executed by the processor or information stored on or in the medium 402 to be processed by the program. The medium may, for example, be a disk or flash memory. Typically, in operation, the processor causes data to be read from the nonvolatile recording medium 402 into another memory 404 that allows for faster access to the information by the processor than does the medium 402. This memory 404 is typically a volatile, random access memory such as a dynamic random access memory (DRAM) or static memory (SRAM). It may be located in storage system 312, as shown, or in memory system 304. The processor 302 generally manipulates the data within the integrated circuit memory 304, 404 and then copies the data to the medium 402 after processing is completed. A variety of mechanisms are known for managing data movement between the medium 402 and the integrated circuit memory element 304, 404, and the invention is not limited thereto. The invention is not limited to a particular memory system 304 or storage system 312.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 300 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components that that shown in FIG. 3.

Computer system 300 may be a general-purpose computer system that is programmable using a high-level computer programming language. Computer system 300 may be also implemented using specially programmed, special purpose hardware. In computer system 300, processor 302 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java)

code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various to embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Embodiments described herein provide an HTTP/HTTPS parallel processing router capable of handling a greater number of requests and communicating with a greater number of stores than a HTTP/HTTPS serial processing or an asynchronous MQ processing router, over the same period of time. As described herein, by "fanning out" a single request from a client 102 to multiple store servers 108, compiling the multiple responses from the store servers 108 into a single response and transmitting the single response to the client 102, the router 100 is able to quickly communicate a single request to a relatively large number of stores and gather information regarding one or more products. Additionally, the router 100 is able to handle a relatively large number of requests over a given period of time.

What is claimed is:

1. A server comprising:
a router, the router having a first Input/Output (I/O) terminal and a second I/O terminal;
wherein the first I/O terminal of the router is configured to be in communication with at least one client via a first network;
wherein the second I/O terminal of the router is configured to be in communication with a plurality of remote servers via a second network; and
wherein the router is configured to:
receive, at the first I/O terminal via the first network, a web services request from the at least one client;
identify, based on the web services request from the at least one client, a group of the plurality of remote servers that are capable of fulfilling the web services request; and
transmit, in parallel via the second I/O terminal and the second network, the received web services request to each one of the plurality of remote servers within the group.

2. The server of claim 1, wherein the router is a code-based router implemented in the server.

3. The server of claim 2, wherein the router is implemented in a Customer Information Control System (CICS) of a mainframe platform.

4. The server of claim 1, wherein the router is further configured to:
receive, at the second I/O terminal and via the second network, a plurality of responses to the web services request from the plurality of remote servers within the group;
compile the plurality of responses from the plurality of remote servers into a single response; and
transmit, via the first I/O terminal and the first network, the single response to the at least one client.

5. The server of claim 4, wherein at least one of the plurality of responses received by the router from the plurality of remote servers includes information retrieved from databases within the plurality of remote servers.

6. The server of claim 5, wherein the at least one of the plurality of responses received by the router from the plurality of remote servers includes price information related to at least one product.

7. The server of claim 5, wherein the at least one of the plurality of responses received by the router from the plurality of remote servers includes availability information related to at least one product.

8. The server of claim 1, wherein the web services request transmitted to each one of the plurality of remote servers within the group includes Universal Product Code (UPC) information related to at least one product.

9. The server of claim 8, wherein a first web services request transmitted to a first group of the plurality of remote servers includes first UPC information related to a first product and wherein a second web services request transmitted to a second group of the plurality of remote servers includes second UPC information related to a second product.

10. A method for operating a router configured to communicate with at least one client and a plurality of remote servers, the method comprising:
receiving, at a first Input/Output (I/O) terminal of the router via a first network, a web services request from the at least one client;
identifying, based on the web services request from the at least one client, a group of the plurality of remote servers that are capable of fulfilling the request; and
transmitting in parallel, through a second I/O terminal of the router via a second network, the web services request to each one of the plurality of remote servers within the group.

11. The method of claim 10, further comprising:
receiving, by the router from the plurality of remote servers, a plurality of responses to the web services request;
compiling the plurality of responses from the plurality of remote servers into a single request; and
transmitting the single request to the at least one client.

12. The method of claim 11, further comprising:
retrieving, by at least one of the plurality of remote servers from a database within the at least one of the plurality of remote servers, information based on the web services request; and
transmitting, by the at least one of the plurality of remote servers to the router, one of the plurality of responses including the information based on the web services request.

13. The method of claim 10, wherein receiving, at the router, a web services request includes receiving, at the router, a request for information generated by an individual at a computer.

14. The method of claim 10, wherein the web services request transmitted from the router to each one of the plurality of remote servers within the group includes UPC information related to at least one product.

15. The method of claim 14, wherein at least one of the plurality of responses to the web services request includes at least one of price and availability information related to the at least one product.

16. The method of claim 14, wherein transmitting the web services request to each one of the plurality of remote servers within the group includes transmitting a request for information including first UPC information related to a first product to a first group of the plurality of remote servers and transmitting a request for information including second UPC information related to a second product to a second group of the plurality of remote servers.

17. A non-transitory computer readable medium comprising computer-executable instructions that when executed on a processor performs a method for operating a router configured to communicate with at least one client and a plurality of remote servers, the method comprising:
    receiving, at a first Input/Output (I/O) terminal of the router via a first network, a web services request from the at least one client;
    identifying, based on the web services request from the at least one client, a group of the plurality of remote servers that are capable of fulfilling the request; and
    transmitting in parallel, through a second I/O terminal of the router via a second network, the web services request to each one of the plurality of remote servers within the group.

18. The non-transitory computer readable medium of claim 17, further comprising:
    receiving, by the router from the plurality of remote servers, a plurality of responses to the web services request;
    compiling the plurality of responses from the plurality of remote servers into a single request; and
    transmitting the single request to the at least one client.

19. The non-transitory computer readable medium of claim 17, wherein the web services request transmitted from the router to each one of the plurality of remote servers within the group includes UPC information related to at least one product.

20. The non-transitory computer readable medium of claim 17, wherein at least one of the plurality of responses to the web services request includes at least one of price and availability information related to the at least one product.

* * * * *